United States Patent Office 3,487,009
Patented Dec. 30, 1969

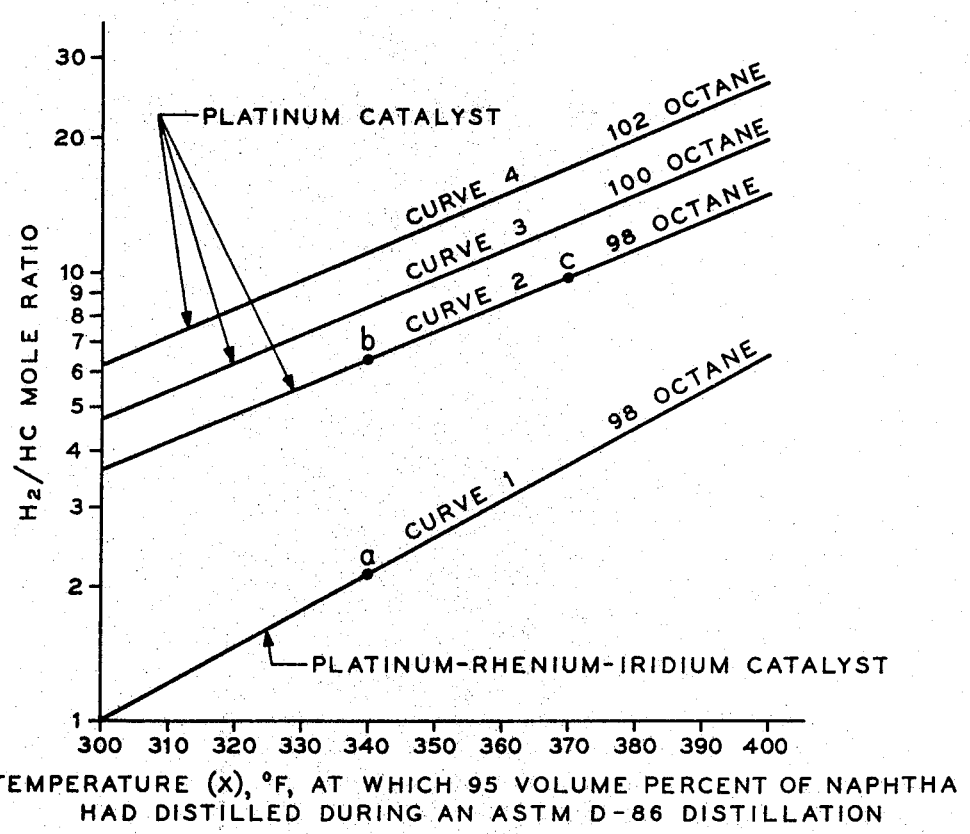

3,487,009
LOW PRESSURE REFORMING WITH A PLATINUM-RHENIUM-IRIDIUM CATALYST
Robert L. Jacobson, Pinole, Harris E. Kluksdahl, San Rafael, and Burwell Spurlock, Lafayette, Calif., assignors to Chevron Research Company, San Francisco, Calif., a corporation of Delaware
Continuation-in-part of application Ser. No. 650,542, June 30, 1967. This application Mar. 24, 1969, Ser. No. 809,611
Int. Cl. C10g 35/08
U.S. Cl. 208—138
13 Claims

ABSTRACT OF THE DISCLOSURE

Reforming a naphtha in the presence of hydrogen at low pressures to produce at least 98 F–1 clear octane gasoline with a catalyst composition of a porous inorganic oxide carrier containing 0.01 to 0.3 weight percent platinum, 0.01 to 0.3 weight percent rhenium and 0.001 to 0.1 weight percent iridium. The pressure is maintained below 300 p.s.i.g., and the feed rate is at least 1.5 LHSV. The hydrogen to hydrocarbon mole ratio is related to the distillation properties of the naphtha processed and to the octane number of the gasoline produced. The reforming process is characterized by the capability of operating onstream for at least 2000 hours with no greater than a 2 volume percent decline in the gasoline yield in 2000 hours.

CROSS-REFERENCE

This application is a continuation-in-part of application Ser. No. 650,542, filed June 30, 1967, now Patent 3,434,960.

BACKGROUND OF THE INVENTION

Field

This invention relates to hydrocarbon reforming processes. More particularly, the present invention is concerned with reforming processes conducted at low pressures to produce high octane gasolines.

Prior art

Reforming is well known in the petroleum industry and refers to the treatment of naphtha fractions in the presence of hydrogen and a catalyst having dehydrogenation activity to improve the octane rating. During a period of use the catalyst decreases in activity for several reasons, one of which is the deposition of carbon and carbonaceous material thereon. Thus, the catalyst must be replaced periodically; or, more desirably, the catalyst must be regenerated periodically by heating it to a high temperautre, for example, in the presence of an oxygen-containing gas, to restore at least part of the original catalytic activity. Hence, reforming processes can be broadly classified according to the onstream period of operation permissible before replacement of the used catalyst with fresh catalyst, or regeneration of the used catalyst, as the case may be. The process of the present invention is to be distinguished from reforming processes which operate for onstream periods of use before regeneration of only a few hours or a few days. The present invention relates to reforming processes characterized by being capable of running for a period of at least 2000 hours before replacement or regeneration.

Most catalytic reforming processes which run for long onstream periods of time operate at high reaction pressures, e.g., at pressures greater than 350 p.s.i.g. and more particularly at pressures from 400 to 500 p.s.i.g. High pressures have heretofore been necessary in order to control coke deposition and catalyst deactivation. When reforming at low pressures, e.g., below 300 p.s.i.g., to produce high quality gasoline of at least 98 octane, conventional catalysts heretofore used have rapidly fouled, i.e., become deactivated, thereby preventing the reforming processes from operating for onstream periods of greater than 2000 hours with reasonable $C_5+$ liquid yield declines, e.g., $C_5+$ liquid yield declines of no greater than 2 volume percent over a period of 2000 hours. It is recognized in the petroleum industry, however, that catalytic reforming processes at low pressures result in substantial increases in yield of gasoline products of high octane rating. Thus, extensive research has been devoted to the development of low pressure reforming processes and catalysts for use therein. In view of the increased demand for high octane gasolines and particularly in view of the public pressure to prohibit the use of lead in gasolines to increase octane rating, the development of low pressure reforming processes has increased in importance.

Catalysts generally used for reforming processes contain platinum supported on porous solid carriers, e.g., alumina. It is possible to operate reforming processes with supported platinum catalysts at low pressures for long onstream periods of time, e.g., greater than 2000 hours, but only with catalyst compositions and/or reforming conditions that make the processes economically unattractive. Thus, extremely high levels of platinum, e.g., greater than 1 weight precent, can be used on a catalyst, thereby enabling a reforming process to be conducted at low pressures to produce high octane gasolines. The cost of platinum, however, makes this avenue of approach to low pressure reforming unattractive. Other approaches to low pressure reforming include lowering the liquid hourly space velocity or increasing the hydrogen to hydrocarbon mole ratio; these approaches are undesirable because of the decrease in feed processed in the first instance and because of the high cost incurred in recirculating hydrogen at low pressures in the second instance. It is apparent, therefore, that low pressure reforming processes to produce high octane gasoline for long onstream periods of operation have heretofore been plagued with difficulties which have effectively prevented said low pressure reforming from being commercially practical.

SUMMARY OF THE INVENTION

In application Ser. No. 758,673, filed Sept. 10, 1968, a novel catalytic composition useful for reforming processes was described. The catalyst described in the above-identified application comprises a porous solid carrier support having associated therewith 0.01 to 0.3 weight percent platinum, 0.01 to 0.3 weight percent rhenium and 0.001 to 0.1 weight percent iridium. Furthermore, the catalyst is described as having unexpectedly high selectivity and stability over catalysts comprising platinum without rhenium and iridium in reforming of naphtha fractions. The description of the catalyst in the above-stated application is incorporated herein as part of this application by reference thereto.

It has now been found that the catalyst composition comprising 0.01 to 0.3 weight percent platinum, 0.01 to 0.3 weight percent rhenium and 0.001 to 0.1 weight percent iridium associated with a porous solid catalyst carrier is especially suitable for low pressure-high severity reforming, i.e., reforming at pressures below 300 p.s.i.g., to produce a gasoline product having an F–1 clear octane number of at least 98. The present inventive process for catalytically reforming a naphtha to obtain a reformate having an F–1 clear octane number of at least 98 comprises contacting said naphtha and hydrogen with a porous solid carrier, preferably a porous inorganic oxide carrier containing from 0.01 to 0.3 weight percent platinum, 0.01 to 0.3 weight percent rhenium and 0.001 to 0.1 weight percent iridium at reforming conditions including a pressure of less than about 300 p.s.i.g., a liquid hourly space velocity of at least 1.5, and a hydrogen to hydrocarbon mole ratio ($H_2/HC$) less than the value determined from the equation $$\log \frac{H_2}{HC} = 0.0062x - k$$

where $x$ is the temperature at which 95 volume percent of said naphtha had been distilled during an ASTM D-86 distillation, and where $k$ depends on the F-1 clear octane number (O.N.) of the reformate being produced according to the equation $$k = -0.060(O.N.) + 7.18$$

The process is characterized by the capability of running for an onstream period of at least 2000 hours with a $C_5+$ liquid yield decline of no greater than 2 volume percent over 2000 hours. The process is particularly suitable for use with alumina as the porous inorganic oxide carrier.

As a specific embodiment, the process of the present invention comprises catalytically reforming a naphtha, the temperature at which 95 volume percent of said naphtha distilled during an ASTM D-86 distillation being from 340° F. to 370° F., to obtain a reformate having an F-1 clear octane number of at least 98, the process being characterized by an onstream period of at least 2000 hours with a $C_5+$ liquid yield decline of no greater than 2 volume percent over 2000 hours, by contacting said naphtha and hydrogen with a catalyst comprising a porous inorganic oxide carrier containing from 0.01 to 0.3 weight percent platinum, 0.01 to 0.3 weight percent rhenium and 0.001 to 0.1 weight percent iridium at reforming conditions including a pressure of less than 300 p.s.i.g., a liquid hourly space velocity of at least 1.5, and a hydrogen to hydrocarbon mole ratio of less than 6.4 when a reformate having an F-1 clear octane number of 98 is being produced and being increased by about 4/3 moles of hydrogen per octane number as the F-1 clear octane number of the reformate being produced is raised from 98 to 104.

BRIEF DESCRIPTION OF THE DRAWING

The present invention can be better understood and will be further explained hereinafter with reference to the graph in the figure.

The graph in the figure shows, as a function of the temperature at which 95 volume percent of a naphtha distilled during an ASTM D-86 distillation (often referred to hereinafter as the 95% boiling point temperature), the hydrogen to hydrocarbon ($H_2/HC$) mole ratio necessary to reform a naphtha to a gasoline product of a specified octane number using a low platinum-rhenium-iridium content catalyst (curve 1) and a catalyst comprising platinum without rhenium and iridium (curves 2 through 4). The curves in the figure are based on correlations of the F-1 clear octane number of the product, the hydrogen to hydrocarbon mole ratio, and the 95% boiling point temperature of a naphtha for reforming at a pressure of 300 p.s.i.g. and a liquid hourly space velocity of 1.5. Curves 1 and 2 are for reforming processes to produce a gasoline having an F-1 clear octane number of 98. Curves 3 and 4 are for reforming processes to produce a gasoline product having an F-1 clear octane number of 100 and 102, respectively.

DESCRIPTION OF THE INVENTION

The catalyst which finds use in the low pressure-high severity reforming process of the present invention comprises a porous solid carrier, preferably a porous inorganic oxide carrier or support containing from 0.01 to 0.3 weight percent platinum, 0.01 to 0.3 weight percent rhenium and 0.001 to 0.1 weight percent iridium. Porous inorganic oxide carriers or supports which find use in the present invention include a large number of materials upon which the catalytically active amounts of platinum, rhenium and iridium can be disposed. By "porous" inorganic oxide support is meant an inorganic oxide having a surface area preferably from 50 to 700 m.²/gm. and more preferably from 150 to 700 m.²/gm. The support can be naturally or synthetically produced inorganic oxides or combinations of inorganic oxides. Typical acidic inorganic oxide supports which can be used are the naturally occurring aluminosilicates, particularly when acid treated to increase the activity, and the synthetically produced cracking supports, such as silica-alumina, silica-zirconia, silica-alumina-zirconia, silica-magnesia, silica-alumina-magnesia, and crystalline zeolitic aluminosilicates. Generally, however, reforming processes are preferably conducted in the presence of catalysts having a low cracking activity, i.e., catalysts of limited acidity. Hence, preferred catalysts are inorganic oxides such as magnesia and alumina.

A particularly preferred catalytic carrier for purposes of this invention is alumina. Any of the forms of alumina suitable as a support for reforming catalysts can be used. Furthermore, alumina can be prepared by a variety of methods satisfactory for the purposes of this invention. The preparation of alumina for use in reforming catalysts is well known in the prior art. Thus, the alumina may be prepared as alumina hydrosol, alumina hydrogel, alumina xerogel, alumina monohydrate, sintered alumina, and the like.

The reforming catalyst comprises the desired porous solid carrier having disposed thereon in intimate admixture catlayctically active amounts of platinum, rhenium and iridium. The catalysts proposed for use in the present invention comprises platinum in amounts of from 0.01 to 0.3 weight percent and more preferably from 0.01 to 0.2 weight percent based on the finished catalyst. The concentration of rhenium in the final composition is from 0.01 to 0.3 weight percent and preferably from 0.01 to 0.2 weight percent. The iridium concentration in the finished catalyst composition is from 0.001 to 0.1 weight percent and preferably from 0.01 to 0.1 weight percent. The platinum, rhenium and iridium may exist as metals or as compounds on the finished catalyst. Reference to "platinum," "rhenium" and "iridium" is meant to include the metallic form as well as the compound form. The weight percent of the platinum, rhenium and iridium is calculated on the basis of the metal.

Although the components, platinum, rhenium and iridium, can be intimately associated with the porous solid carrier by suitable techniques such as by ion-exchange, coprecipitation, etc., the components are usually associated with the porous solid carrier by impregnation. Furthermore, one of the components can be associated with the carrier by one procedure, e.g., ion-exchange, and the other components associated with the carrier by another procedure, e.g., impregnation. As indicated, however, the components are preferably associated with the carrier by impregnation. The catalyst can be prepared either by coimpregantion of the three components or by sequential impregnation. In general, the carrier material is impregnated with an aqueous solution of a decomposable compound of the metal in sufficient concentration to provide the desired quantity of component in the finished catalyst; the resulting mixture is then heated to remove water. Chloroplatinic acid is generally the preferred source of platinum. Other feasible platinum-containing compounds, e.g., ammonium chloroplatinates and polyammineplatinum salts, can also be used. Rhenium compounds suitable for incorporation onto the carrier include, among others, perrhenic acid and ammonium perrhenates. Iridium compounds suitable for incorporation onto the carrier include, among others, chloroiridic acid, iridium tribromide, ammonium chloroiridate, iridium trichloride, and ammonium chloroiridite.

It is contemplated in the present invention that incorporation of the components, platinum, rhenium and iridium, with the carrier can be accomplished at any particular stage of the catalyst preparation. For example, if the components are to be incorporated onto an alumina support, the incorporation may take place while the alumina is in the sol or gel form followed by precipitation of the alumna. Alternatively, a previously prepared alumina carrier can be impregnated with a water solution of the metal compounds.

Following incorporation of the carrier material with platinum, rhenium and iridium, the resulting composite is usually dried by heating at a temperature of, for example, no greater than about 500° F. and preferably at about 200° F. to 400° F. Thereafter the composite can be calcined at an elevated temperature, e.g., up to about 1200° F., if desired. It may be desirable to incorporate one or two components, for example, platinum and rhenium, with the carrier, followed by drying and low temperature calcination, before incorporating the other component.

The carrier containing 0.01 to 0.3 weight percent platinum, 0.01 to 0.3 weight percent rhenium and 0.001 to 0.1 weight percent iridium is preferably heated at an elevated temperature in the presence of a reducing atmosphere. Preferably the heating is performed in the presence of hydrogen and more preferably in the presence of dry hydrogen. It is particularly preferred that this prereduction be accomplished at a temperature in the range of from 60 to 1300° F., preferably 600 to 1000° F.

The catalyst composite of the present invention, i.e., low content platinum, rhenium and iridium supported on a porous inorganic oxide carrier, can be sulfided prior to contact with the naptha to be reformed. The presulfiding can be done in situ or ex situ by passing a sulfur-containing gas, e.g., $H_2S$, through the catalyst bed. Other presulfiding techniques are known in the prior art. Furthermore, the catalyst can be sulfided on startup by adding a sulful-containing compound, e.g., $H_2S$ or dimethyldisulfide, to the reforming zone in the presence of the naptha. The exact form of the sulfur used in the sulfiding process is not critical. The sulfur can be introduced to the reaction zone in any convenient manner and at any convenient location. It can be contained in the liquid hydrocarbon feed, the hydrogen-rich gas, the recycle liquid stream or a recycle gas stream or any combination. After operating the reforming process in the presence of sulfur for a period of time short in comparison to the over-all run length which can be obtained with the catalyst, the addition of sulfur is preferably discontinued. The purpose for presulfiding the catalyst prior to contact with the naptha or sulfiding the catalyst during the initial contact with naphtha is to reduce the initial excessive hydrocracking activity of the catalyst which results in the production of high yields of light hydrocarbon gases, e.g., methane, during the early part of the reforming process.

The catalyst can be promoted for reforming by the addition of halides, particularly fluoride or chloride. The halides apparently provide a limited amount of acidity to the catalyst which is beneficial to most reforming operations. The catalyst promoted with halide preferably contains from 0.1 to 3 weight percent total halide content and preferably from 0.1 to 2 weight percent. The halides can be incorporated onto the catalyst carrier at any suitable stage of catalyst manufacture, e.g., prior to or following incorporation of the platinum, rhenium and iridium. Some halide is often incorporated onto the carrier when impregnating with the components; e.g. impregnation with chloroplatinic acid normally results in chloride addition to the carrier. Additional halide can be incorporated onto the support simultaneously with incorporation of the platinum, rhenium or iridium if so desired. In general, halides are combined with the catalyst carrier by contacting suitable compounds such as hydrogen fluoride, ammonium fluoride, hydrogen chloride, or ammonium chloride, either in the gaseous form or in a water soluble form with the carrier. Preferably, the fluoride or chloride is incorporated onto the carrier from an aqueous solution containing the halide.

The feedstock to be employed in the reforming operation is a light hydrocarbon oil, for example, a napta fraction. Generally, the naptha will boil in the range falling within the limits of from about 70° to 550° F. and preferably from 150° to 450° F. The feedstock can be, for example, either a straight-run naptha or a thermally cracked or catalytically cracked naphtha or blends thereof. Preferably the naphtha is a hydrogenated naphtha, for example, a hydrocracked naphtha. The feed for purposes of the present invention will preferably have a temperature at which 95 volume percent distills during an ASTM D–86 distillation ("ASTM Standards," Petroleum Products—Fuels, Solvents, Engine Tests, Lubricating Oils, Cutting Oils, Grease, Part 17, 1965) of at least 300° F. but not greater than 400° F., and more preferably from 320° F. to 380° F., and most preferably from 340° F. to about 370°F. That is, for a naphtha fraction preferably finding use for purposes of the present invention, 95 volume precent of said naphtha will distill during an ASTM D–86 distillation at a temperature falling within the preferred ranges specified above. It is preferred to characterize the boiling point of the feed in terms of the temperature at which 95 volume percent of the feed had been distilled during ASTM D–86 distillation since this temperature is more reproducible than the true end point of the feed and more indicative of the boiling characteristics of the feed. A naphtha fraction often contains small amounts of high boiling components; thus the end boiling point of feed, as measured by an ASTM distillation, will be very high, and not indicative of where the bulk of the naphtha distills.

It is preferred that the feed for purposes of the present invention be substantially sulfur free; that is, the feed should preferably contain less than about 10 p.p.m. sulfur, and more preferably less than 5 p.p.m., and still more preferably, less than 1 p.p.m. In the case of a feedstock which is not already low in sulfur, accepted levels can be reached by hydrogenating the feedstock in a presaturation zone where the naphtha is contacted with a hydrogenation catalyst which is resistant to sulfur poisoning. A suitable catalyst for this hydrodesulfurization process is, for example, an alumina-containing support and a minor proportion of molybdenum oxide and cobalt oxide. Hydrodesulfurization is ordinarily conducted at a temperature from 750° F. to 850° F., a pressure from 200 to 2000 p.s.i.g., and a liquid hourly space velocity from 1 to 5. The sulfur contained in the naphtha is generally converted to hydrogen sulfide which can be removed prior to reforming by suitable conventional processes.

The present inventive low pressure reforming process is characterized by being capable of producing a gasoline product having an F–1 clear octane number of at least 98 for a period of at least 2000 hours with a $C_5+$ liquid decline of no greater than 2 volume percent over 2000 hours. An onstream period of reforming, e.g., the period of time before replacement or regeneration is required, of less than 2000 hours is not generally economically attractive. For example, the expense involved in shutting down a reactor to regenerate the catalyst either in situ or ex situ prohibits too frequent regenerations, i.e. regenerations after less than 2000 hours onstream time. Too frequent regenerations are undesirable not only because of materials and manpower involved during regeneration but also because of the time lost in producing high octane gasolines. Furthermore, a $C_5+$ liquid yield decline of greater than 2 volume percent over 2000 hours is generally considered uneconomical for a reforming process. If the gasoline liquid yield, that is the $C_5+$ liquid yield, decreases at a rate greater than 2 volume percent over 2000 hours, then the catalyst is fouling too rapidly, thereby necessitating too frequent replacements or regenerations of the catalyst to restore catalytic activity. The reforming process of the present invention can operate for a period far in excess of 2000 hours if desired. However, for purposes of the present invention, the reforming process is characterized by a $C_5+$ liquid yield decline of no greater than 2 volume percent measured for the first 2000 hours of reforming. Thus, for example, a reforming process wherein the onstream period of time is 4000 hours and the $C_5+$ liquid yield decline over the 4000 hour period is greater than 2 volume percent is still economically attractive and the process falls within the present invention if the $C_5+$ liquid yield decline for the first 2000 hours is no greater than 2 volume percent.

As a particular embodiment of the present invention it is preferred that the process be characterized by an onstream period of at least 2600 hours with a $C_5+$ liquid yield decline of no greater than 2 volume percent over 2600 hours. Thus, the longer the reforming process can operate between catalyst replacements or regenerations with only a 2 volume percent $C_5+$ liquid yield decline, the more economical in general is the process. The hydrogen to hydrocarbon mole ratio must generally be increased when the other reforming conditions remain unchanged in order to obtain longer onstream periods of use.

The pressure in the reforming reaction zone for purposes of the present invention is less than 300 p.s.i.g. Preferably, the pressure will be at least 75 p.s.i.g., but less than 300 p.s.i.g. and more preferably, at least 125 p.s.i.g., but less than 300 p.s.i.g. The pressure is determined as the average reactor pressure. Thus, for example, in a process where several reactors are in series, with the feed flowing from the outlet of one reactor to the inlet of another reactor, the pressure of the reforming process, i.e., the pressure of less than 300 p.s.i.g., will be the average of the pressures throughout the several reactors.

The feed rate for use in the present invention, i.e. the liquid hourly space velocity (LHSV), is at least 1.5. High space rates, i.e. at least 1.5, permit greater volumes of feed to be processed, thus adding to the economics of the reforming process. Preferably the feed rate is at an LHSV from 1.5 to 6 and more preferably from 1.5 to 4.

The temperature in the reforming process will generally be within the range of 600° F. to 1100° F. and preferably about 700° F. to 1050° F. The temperature will be determined, however, by the other operating conditions; that is, at a particular pressure, liquid hourly space velocity and hydrogen to hydrocarbon ratio, the temperature is determined by the desired octane number of the product to be produced.

Reforming generally results in the production of hydrogen. Thus, excess hydrogen need not necessarily be added to the reforming process. However, it is usually preferred to introduce excess hydrogen at some stage of the operation as, for example, during startup. The hydrogen can be introduced into the feed prior to contact with the catalyst or can be contacted simultaneously with the introduction of feed to the reaction zone. Generally, hydrogen is recirculated over the catalyst prior to contact of the feed with the catalyst.

Reforming of a naphtha fraction is accomplished by contacting the naphtha and hydrogen at reforming conditions with the desired catalyst. The hydrogen can be in admixture with light gaseous hydrocarbons, for example, methane. Hydrogen serves to reduce the formation of coke which tends to poison the catalyst. Moreover, the presence of hydrogen can be used to favor certain reforming reactions such as isomerization, dehydrogenation, or hydrocracking. Generally, hydrogen is recovered from the reaction products and is generally purified and recycled to the reaction zone. The hydrogen to hydrocarbon mole ratio required for purposes of the present invention is measured at the inlet of the reactor and in the case of several reactors in series, at the inlet of the first reactor.

For purposes of the present invention, the hydrogen to hydrocarbon mole ratio ($H_2/HC$) should be less than the value determined by the relationship $$\log \frac{H_2}{HC} = 0.0062x - k$$

(log to the base 10) where $x$ is the temperature at which 95 volume percent of the naphtha had been distilled during ASTM D–86 distillation and where $k$ is defined in terms of the F–1 clear octane number (O.N.) of the gasoline or reformate produced according to the relationship $$k = -0.060(O.N.) + 7.18$$

Thus, the maximum hydrogen to hydrocarbon mole ratio permissible for purposes of the present invention will vary depending upon the 95% boiling point temperature of the feed being reformed and upon the F–1 clear octane number of the reformate being produced in accordance with the above equations. At hydrogen to hydrocarbon mole ratios less than the value determined from the above equations and at the other reforming conditions specified for the present invention, i.e., a pressure less than 300 p.s.i.g., and an LHSV of at least 1.5, reforming processes to produce at least 98 F–1 clear octane gasoline using a platinum catalyst comprising no more than 0.3 weight percent platinum but without rhenium and iridium will not be characterized by the capability of running for an onstream period of operation of at least 2000 hours with a $C_5+$ liquid yield decline of no greater than 2 volume percent over 2000 hours.

The relationship of the hydrogen to hydrocarbon mole ratio to the 95% boiling point temperature of the feed and the octane number of the gasoline product can be better understood by reference to the figure. The graph in the figure shows the relationship between the hydrogen to hydrocarbon mole ratio required to produce a gasoline product of a desired octane number and the temperature at which 95 volume percent of naphtha distilled during an ASTM D–86 distillation. The curves (curves 1 through 4) were obtained from correlations of the hydrogen to hydrocarbon mole ratio, the F–1 clear octane number of the product produced and the 95% boiling point temperature of the feed for reforming at a liquid hourly space velocity of 1.5 and a pressure of 300 p.s.i.g. The reforming process was characterized by an onstream period of 2000 hours with a $C_5+$ liquid yield decline of 2 volume percent over the 2000 hours. Curve 1 is based on a reforming process to produce a 98 F–1 clear octane number gasoline using a catalyst comprising alumina in association with about 0.3 weight percent platinum, about 0.1 weight percent rhenium and about 0.025 weight percent iridium based on the final catalyst composition. Curves 2, 3 and 4 are based on reforming processes using catalysts comprising alumina containing about 0.3 weight percent platinum without rhenium and iridium to produce F–1 clear octane number gasolines of 98, 100, and 102, respectively.

Curve 2 of the figure is defined by the equation $$\log \frac{H_2}{HC} = 0.0062x - k$$

where $k$ equals 1.30 and where $x$ is the 95% boiling point temperature of the feed. This relationship between the hydrogen to hydrocarbon mole ratio and the 95% boiling point temperature of the feed is for a reforming process using a catalyst comprising 0.3 weight percent platinum and containing no rhenium and no iridium and wherein the pressure is 300 p.s.i.g. and the liquid hourly space velocity is 1.5. The hydrogen to hydrocarbon mole ratio determined from the above equation for a particular feedstock is the lowest hydrogen to hydrocarbon mole ratio that can be used and still have a low pressure-high severity reforming process using a platinum catalyst without rhenium and iridium to produce a 98 F–1 clear octane gasoline product for an onstream period of time of at least 2000 hours with a $C_5+$ liquid yield decline of no greater than 2 volume percent over 2000 hours. At lower hydrogen to hydrocarbon mole ratios, the process using a platinum catalyst containing no more than about 0.3 weight percent platinum without rhenium and iridium will not operate for the desired length of time with the desired low yield decline. Furthermore, a decrease in the pressure to lower than 300 p.s.i.g. will require an increase in the hydrogen to hydrocarbon mole ratio to obtain the same conversion to 98 octane gasoline. Likewise, increasing the space velocity to greater than 1.5 will require an increase in the hydrogen to hydrocarbon mole ratio to obtain the same conversion to 98 octane gasoline. Decreasing the platinum concentration in the catalyst to a value less than 0.3 weight percent will also necessitate an increase in the hydrogen to hydrocarbon mole ratio to obtain the desired conversion. Thus, it is apparent that the above expression for the hydrogen to hydrocarbon mole ratio to produce a 98 F–1 clear octane gasoline product ($k$ equals 1.30) gives the lowest tolerable hydrogen to hydrocarbon mole ratio for a reforming process using a platinum catalyst comprising no more than 0.3 weight percent platinum and operated at reforming conditions including a pressure of less than 300 p.s.i.g. and a liquid hourly space velocity of at least 1.5 and with the desired run length time and yield decline.

An increase in the hydrogen to hydrocarbon mole ratio is necessary in order to increase the octane number of the gasoline fraction produced during reforming while maintaining the LHSV and the pressure constant, e.g. at an LHSV of 1.5 and a pressure of 300 p.s.i.g. Thus, referring to the figure, curves 3 and 4 show the relationship of the hydrogen to hydrocarbon mole ratio to the 95% boiling point temperature to obtain 100 F–1 clear octane gasoline and 102 F–1 clear octane gasoline, respectively, when reforming with a platinum catalyst. The reforming conditions other than the hydrogen to hydrocarbon mole ratio are the same for curves 2, 3 and 4. A logarithmic expression similar to that used to define curve 2 can be used to define curves 3 and 4, but with a different value for $k$: $k$ will vary according to the octane number of the product produced according to the expression:

$$k = -0.060(O.N.) + 7.18$$

The value of $k$ decreases from a value of about 1.30 for an octane number of 98 to a value of about 1.06 for an octane number of 102.

Referring to curve 1 of the figures, it is noted, by way of example, that reforming a naphtha having a temperature at which 95 volume percent had distilled during an ASTM D–86 distillation of 340° F., at reforming conditions including a pressure of 300 p.s.i.g. and a liquid hourly space velocity of 1.5, to produce a gasoline product having an F–1 clear octane number of 98, requires a hydrogen to hydrocarbon mole ratio of at least about 2.1 when using a catalyst comprising 0.3 weight percent platinum, 0.1 weight percent rhenium and 0.025 weight percent iridium in order for the process to be characterized by an onstream period of time of at least 2000 hours with a $C_5+$ liquid yield decline of no greater than 2 volume percent over 2000 hours (point "$a$" on curve 1). On the other hand, when reforming a similar feed at similar reforming conditions to produce a 98 F–1 clear octane number product using a catalyst comprising 0.3 weight percent platinum with no rhenium and no iridium, a hydrogen to hydrocarbon mole ratio of at least 6.4 is required in order for the reforming process to be characterized by an onstream period of time of at least 2000 hours with a $C_5+$ liquid yield decline of no greater than 2 volume percent over 2000 hours (point "$b$" on curve 2).

As a preferred embodiment of the present invention, a naphtha feed having a temperature at which 95 volume percent had been distilled during an ASTM D–86 distillation falling within the range from 340° F. to 370° F. can be reformed to obtain a reformate having an F–1 clear octane number of at least 98 throughout an onstream period of operation of at least 2000 hours with a $C_5+$ liquid decline of no greater than 2 volume percent over 2000 hours. The naphtha feed and hydrogen are contacted with a supported platinum-rhenium-iridium catalyst containing from 0.01 to 0.3 weight percent platinum, 0.01 to 0.3 weight percent rhenium and 0.001 to 0.1 weight percent iridium in a reforming zone at reforming conditions including a pressure of less than 300 p.s.i.g., a liquid hourly space velocity of at least 1.5, and a maximum hydrogen to hydrocarbon mole ratio of 6.4 when producing a reference having an F–1 clear octane number of 98, the maximum hydrogen to hydrocarbon mole ratio being increased by about 4/3 moles of hydrogen per octane number as the F–1 clear octane number of the reformate being produced is raised from 98 to 104. At the reforming conditions chosen, particularly with a maximum hydrogen to hydrocarbon mole ratio of 6.4 and more preferably of 5.5, and over the 95% boiling point temperature range of the feed, a reforming process using a platinum catalyst comprising no more than 0.3 weight percent platinum and having no rhenium and no iridium present will not be characterized by an onstream period of at least 2000 hours with a $C_5+$ liquid yield decline of no greater than 2 volume percent over 2000 hours when producing a reformate of at least 98 octane. Thus, referring to point "$b$," curve 2 of the figure, it is seen that reforming a low boiling feed, that is, a feed which has a 95% boiling point temperature of 340° F., with a platinum catalyst having 0.3 weight percent platinum at the most favorable reforming conditions, requires a hydrogen to hydrocarbon mole ratio of at least 6.4 in order to maintain the reforming process for 2000 hours with a $C_5+$ liquid yield decline of no greater than 2 volume percent. With higher boiling feeds, higher hydrogen to hydrocarbon ratios are required. Thus, with a feed having a 95% boiling point temperature of 370° F., a hydrogen to hydrocarbon mole ratio of 9.8 is necessary (see point "$c$," curve 2 of the figure). In order to increase the octane number of the reformate produced while reforming at a pressure of less than 300 p.s.i.g. and an LHSV of at least 1.5, the hydrogen to hydrocarbon mole ratio must accordingly be increased. For a reforming process using a catalyst comprising platinum without rhenium and iridium, the hydrogen to hydrocarbon mole ratio must be increased by at least about 4/3 mole of hydrogen per octane number as the F–1 clear octane number of the reformate is raised from 98 to 104. A smaller increase in the hydrogen to hydrocarbon mole ratio than about 4/3 as the octane number of the product is increased will result in too rapid catalyst fouling, thereby preventing the reforming process from being characterized by the capability of operating onstream for at least 2000 hours with a yield decline of no more than 2 volume percent.

The foregoing disclosure of this invention is not to be considered as limited as many variations can be made by those skilled in the art without departing from the scope and spirit of the appended claims.

We claim:

1. A process for catalytically reforming a naphtha to obtain a reformate having an F–1 clear octane number of at least 98 which comprises contacting said naphtha and hydrogen with a catalyst comprising a porous inorganic oxide carrier containing from 0.01 to 0.3 weight percent platinum, 0.01 to 0.3 weight percent rhenium and 0.001 to 0.1 weight percent iridium at reforming conditions including a pressure of less than about 300 p.s.i.g., a liquid hourly space velocity of at least about 1.5, and a hydrogen to hydrocarbon mole ratio ($H_2/HC$) less than a value expressed by the equation $$\log \frac{H_2}{HC} = 0.0062x - k$$

where $x$ is the temperature at which 95 volume percent of said naphtha had been distilled during an ASTM D-86 distillation, and where $k$ depends on the F-1 clear octane number (O.N.) of the reformate being produced according to the equation $$k = -0.060 \text{ (O.N.)} + 7.18$$

the process being characterized by the capability of running for an onstream period of at least 2000 hours with $C_5+$ liquid yield decline of no greater than 2 volume percent over 2000 hours.

2. The process of claim 1 wherein said naphtha is substantially sulfur free.

3. The process of claim 1 wherein said naphtha is a hydrocracked naphtha.

4. The process of claim 1 wherein said carrier contains from 0.01 to 0.2 weight percent platinum, from 0.01 to 0.2 weight percent rhenium and from 0.01 to 0.1 weight percent iridium.

5. The process of claim 1 wherein said liquid hourly space velocity is from 1.5 to 6.

6. The process of claim 1 wherein said pressure is at least 75 p.s.i.g. but less than 300 p.s.i.g.

7. The process of claim 1 wherein said porous inorganic oxide carrier is alumina.

8. The process of claim 1 wherein said naphtha is reformed to obtain a reformate having an F-1 clear octane number of at least 100.

9. The process of claim 1 wherein the temperature at which 95 volume percent of said naphtha had been distilled during an ASTM D-86 distillation is within the range from 300° F. to 400° F.

10. The process of claim 9 wherein said temperature is within the range from 320° F. to 380° F.

11. A process for catalytically reforming a naphtha, the temperature at which 95 volume percent of said naphtha distilled during an ASTM D-86 distillation being from about 340° F. to about 370° F., to obtain a reformate having an F-1 clear octane number of at least 98, the process being characterized by the capability of operating for an onstream period of at least 2000 hours with a $C_5+$ liquid yield decline of no greater than 2 volume percent over 2000 hours, which comprises contacting said naphtha and hydrogen with a catalyst comprising a porous inorganic oxide carrier containing from 0.01 to 0.3 weight percent platinum, 0.01 to 0.3 weight percent rhenium and 0.001 to 0.1 weight percent iridium at reforming conditions including a pressure of less than about 300 p.s.i.g., a liquid hourly space velocity of at least 1.5, and a hydrogen to hydrocarbon mole ratio of less than 6.4 when a reformate having an F-1 clear octane number of 98 is being produced and being increased by about 4/3 moles of hydrogen per octane number as the F-1 clear octane number of the reformate being produced is raised from 98 to 104.

12. The process of claim 11 wherein said carrier is alumina.

13. A process for catalytically reforming a naphtha, the temperature at which 95 volume percent of said naphtha distilled during an ASTM D-86 distillation being from about 340° F. to about 370° F. to obtain a reformate having an F-1 clear octane number of at least 98 which comprises contacting said naphtha and hydrogen with a catalyst comprising a porous inorganic oxide carrier containing from 0.01 to 0.3 weight percent platinum, 0.01 to 0.3 weight percent rhenium and 0.001 to 0.1 weight percent iridium at reforming conditions including a pressure of less than about 300 p.s.i.g., and a liquid hourly space velocity of at least about 1.5, the process being characterized by the capability of running for an onstream period of at least 2600 hours with a $C_5+$ liquid yield decline of no greater than 2 volume percent over 2600 hours, and wherein the maximum number of moles of hydrogen per mole of hydrocarbon in the reaction zone required to obtain the long onstream period which characterizes the process being 6.4 when a reformate having an F-1 clear octane number 98 is being produced and being increased by about 4/3 moles of hydrogen per octane number as the F-1 clear octane number of the reformate being produced is raised from 98 to 104.

References Cited

UNITED STATES PATENTS

| | | | |
|---|---|---|---|
| 2,848,377 | 8/1958 | Webb | 208—138 |
| 2,939,847 | 6/1960 | Smith et al. | 208—139 |
| 3,296,118 | 1/1967 | Czajkowski et al. | 208—138 |
| 3,415,737 | 12/1968 | Kluksdahl | 208—138 |

HERBERT LEVINE, Primary Examiner

U.S. Cl. X.R.

252—466